United States Patent
Clavette et al.

(10) Patent No.: US 9,172,306 B2
(45) Date of Patent: Oct. 27, 2015

(54) DRIVE ENHANCEMENT IN SWITCH DRIVER CIRCUITRY

(71) Applicants: Danny Clavette, Greene, RI (US); Xingsheng Zhou, Barrington, RI (US)

(72) Inventors: Danny Clavette, Greene, RI (US); Xingsheng Zhou, Barrington, RI (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 14/197,358

(22) Filed: Mar. 5, 2014

(65) Prior Publication Data

US 2014/0253077 A1 Sep. 11, 2014

Related U.S. Application Data

(60) Provisional application No. 61/773,381, filed on Mar. 6, 2013.

(51) Int. Cl.
| | |
|---|---|
| *G05F 1/10* | (2006.01) |
| *H02M 3/158* | (2006.01) |
| *H02M 1/08* | (2006.01) |
| *H02M 3/156* | (2006.01) |

(52) U.S. Cl.
CPC ............ *H02M 3/1584* (2013.01); *H02M 1/08* (2013.01); *H02M 3/156* (2013.01); *H02M 2003/1566* (2013.01)

(58) Field of Classification Search
CPC ............... H03K 2017/066; H03K 19/01714; H03K 19/01735
USPC ............... 327/108, 109, 110, 111, 112, 390
See application file for complete search history.

(56) References Cited

U.S. PATENT DOCUMENTS

| | | | | |
|---|---|---|---|---|
| 5,847,946 | A * | 12/1998 | Wong | 363/60 |
| 6,693,480 | B1 * | 2/2004 | Wong | 327/390 |
| 8,558,587 | B2 * | 10/2013 | Machida et al. | 327/109 |
| 8,860,471 | B2 * | 10/2014 | Xu et al. | 327/109 |

* cited by examiner

*Primary Examiner* — Jeffrey Zweizig
(74) *Attorney, Agent, or Firm* — Chapin IP Law, LLC

(57) ABSTRACT

A driver circuitry includes a capacitor, a first switch, and a second switch. The capacitor includes a first node and a second node. The first switch is electrically coupled to the first node of the capacitor. The second switch is electrically coupled to the second node of the capacitor. Additionally, the second node of the capacitor and the second switch are electrically coupled to an output pin of the driver circuitry operable to drive an external switch. As discussed herein, settings of the first switch and the second switch control a voltage outputted from the output pin and charging of the capacitor.

21 Claims, 14 Drawing Sheets

DRIVE ENHANCEMENT IN SWITCH DRIVER CIRCUITRY

RELATED APPLICATIONS

This application is related to and claims the benefit of earlier filed U.S. Provisional Patent Application Ser. No. 61/773,381 entitled "POWER SUPPLY CIRCUITRY AND CONTROL,", filed on Mar. 6, 2013, the entire teachings of which are incorporated herein by this reference.

BACKGROUND

FIG. 1A is an example diagram illustrating a drive circuit according to conventional techniques. As shown, driver circuitry 100 receives control signal 105 to control a state of switch 135. Graph 170-1 in FIG. 1B illustrates a state of the control signal 105 as inputted to control drive circuit 100.

Prior to time T1, as shown in graph 170-1 of FIG. 1B, the control signal 105 is a logic zero (such as approximately zero volts). When the control signal 105 is a logic zero, switch 110-2 is set in an ON state and switch 110-1 is set to an OFF state, resulting in the output 125 driving the corresponding gate of switch 135 to −0.5 V. Note that the output 125 is −0.5 V (instead of ground) due to the voltage present across capacitor 120. In such an instance, switch 135 is open (OFF).

At time T1, the control signal 105 switches from logic low to logic high. This causes switch 110-2 to turn OFF and switch 110-1 to turn ON. In such an instance, the output 125 is 4.5 V (instead of 5 V) due to the −0.5 V across capacitor 120.

At time T2, the control signal 105 switches from logic high to logic low. This causes switch 110-2 to turn ON and switch 110-1 to turn OFF. In such an instance, the output 125 is set −0.5 V (instead of 0.0V) again due to the 0.5 V across capacitor 120.

One purpose of the capacitor 120 is to adjust a range of voltages that are produced at output 125. For example, instead of producing an output of 0 volts (for low voltage level drive) and 5 volts (and high voltage level drive), the output 125 of driver circuitry 100 outputs −0.5 V as a low drive output and 4.5 V as a high drive output.

Application of the −0.5 V for the low drive output level (such as before time T1 and after time T2) helps to ensure that switch 135 stays in an OFF state since the inherent capacitance Cm of switch 135 can cause a voltage spike on 125 (GATEL) thereby momentarily turning on switch 135 resulting in shoot through of current from node SW to the ground when the voltage of node SW changes rapidly from zero volts to 12 volts. In other words, the voltage coupling from node SW to the output 125 may be so high that the switch 135 momentarily turns to an ON state when it is supposed to be shut OFF.

BRIEF DESCRIPTION OF EMBODIMENTS

Conventional techniques of lowering the affect of a shoot-through current from node SW to a respective output 125 as discussed above suffer from a number of deficiencies. For example, skewing the range of output voltage down by 0.5 volts as previously discussed using a respective capacitor 120 in FIG. 1A reduces the magnitude of the high voltage output level of the output 125 to 4.5 V from 5 V. This lower voltage output for the high level is undesirable because it results in a lower voltage applied of the gate of the switch 135 to turn it to an ON state. Typically, it is desirable to apply a high voltage at the respective gate to ensure proper activation and lower RDSon of switch 135.

Additionally, the drive circuitry 100 requires inclusion of diode 122. Integrating the diode 122 requires an extra pin on an integrated circuit (on which drive circuit 100 is fabricated).

Embodiments herein deviate with respect to conventional techniques. For example, one embodiment herein includes enhancements to switch driver circuitry.

More specifically, in accordance with one embodiment, a driver circuitry includes a capacitor, a first switch, and a second switch. The capacitor includes a first node and a second node. The first switch is electrically coupled to the first node of the capacitor. The second switch is electrically coupled to the second node of the capacitor. Additionally, the second node of the capacitor and the second switch are electrically coupled to an output pin of the driver circuitry. The output pin drives an external switch. As discussed herein, settings of the first switch and the second switch control a voltage outputted from the output pin and charging of the capacitor.

The novel driver circuitry as discussed herein includes several enhancements over conventional techniques. For example, certain embodiments of the driver circuitry as discussed herein include driving a negative voltage to a gate of the external switch to prevent the external switch from inadvertently activating when the external switch is to be deactivated to an OFF state. In such an instance, the voltage of the capacitor provides the negative voltage to hold the external switch in the OFF state. Further embodiments herein include increasing a magnitude of an output voltage that is used to turn the external switch to an ON state such that the capacitor (supporting the negative drive voltage) does not reduce a high level output voltage used to turn the external switch to an ON state.

These and other more specific embodiments are disclosed in more detail below.

As discussed herein, techniques herein are well suited for use and fabrication in switch driver circuitry used to drive a switch. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1A:
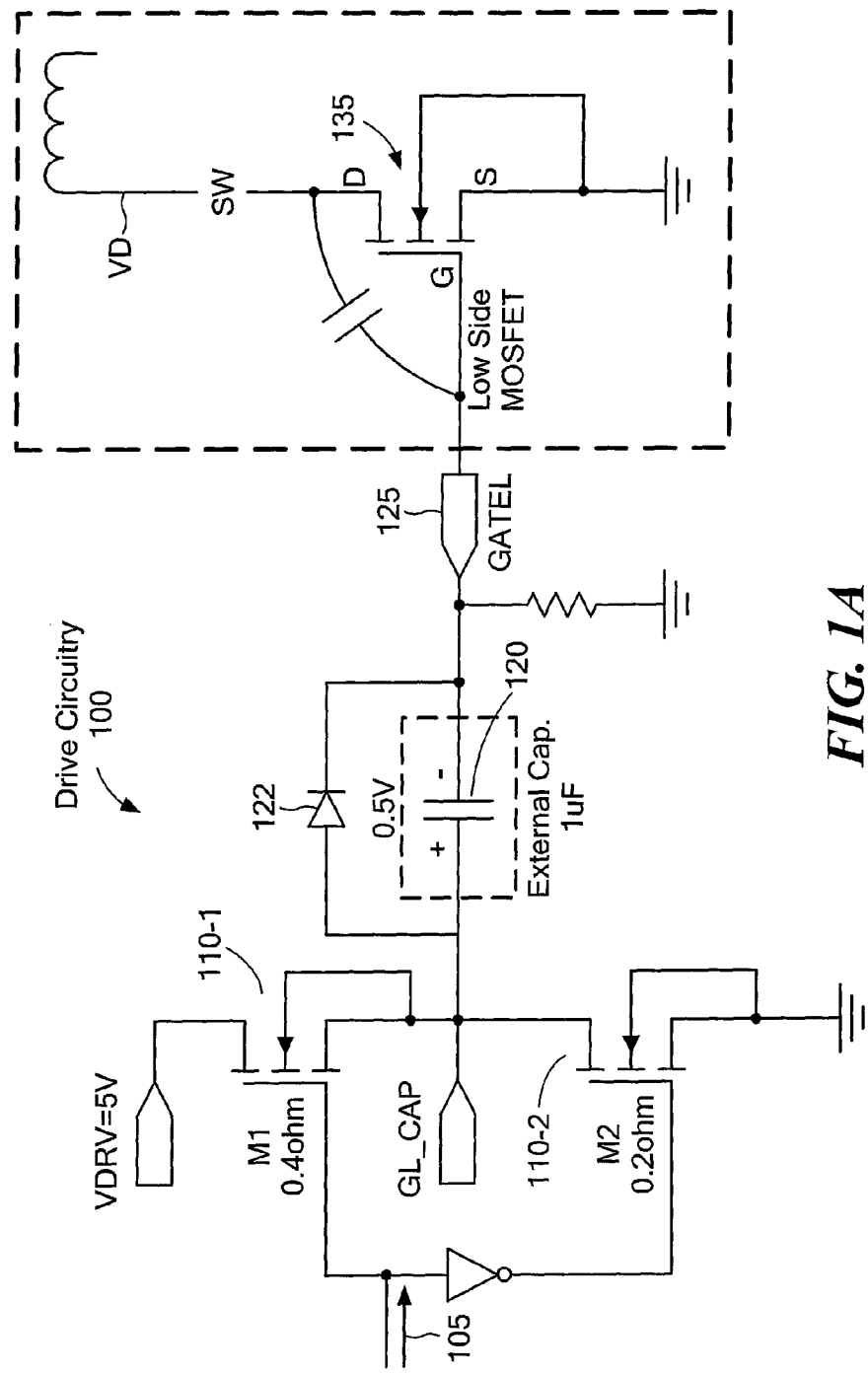
FIG. 1A is an example diagram illustrating a drive circuit according to conventional techniques.
Figure 1B:
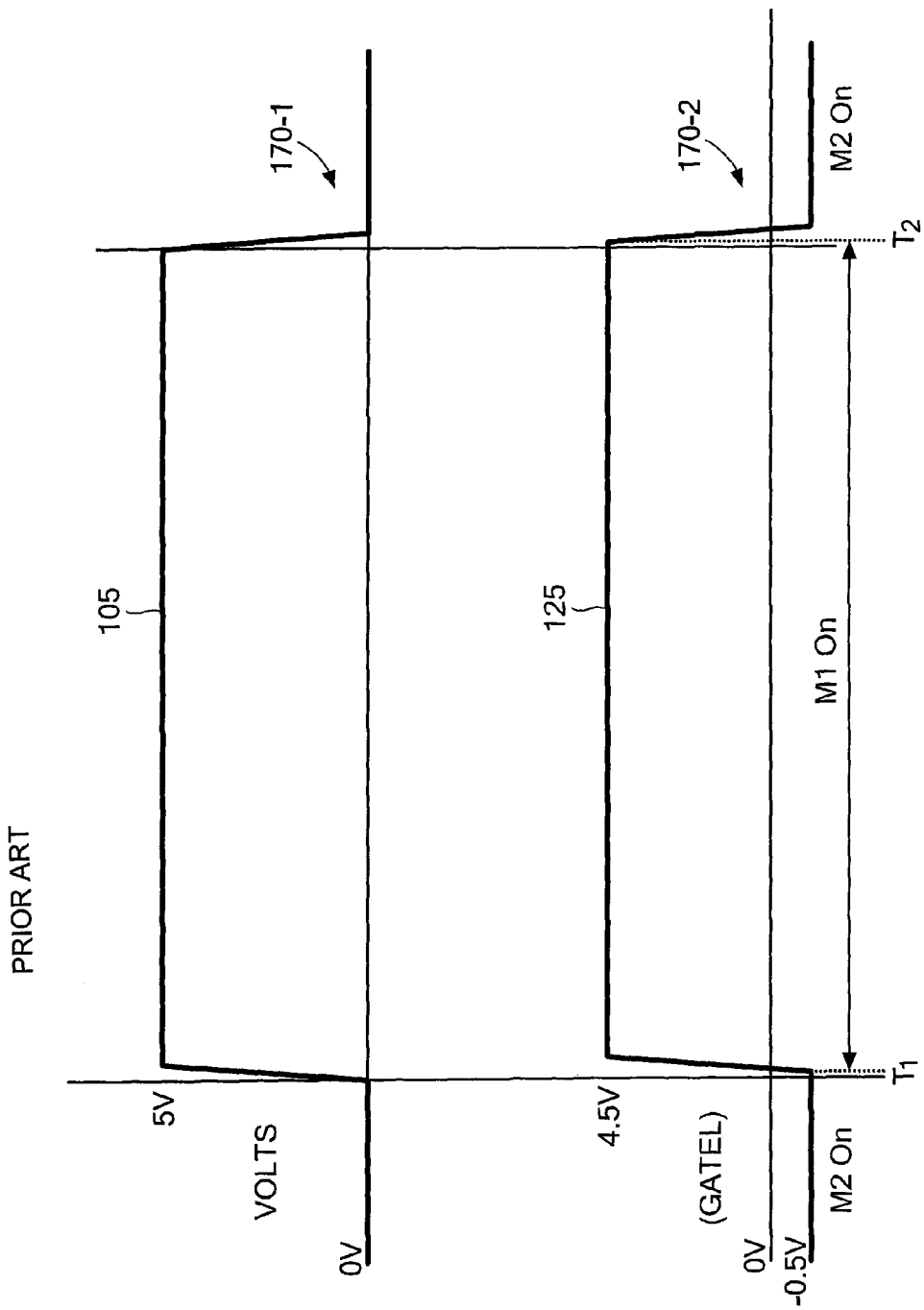
FIG. 1B is an example timing diagram illustrating voltage levels of signals according to conventional techniques.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Figure 2:
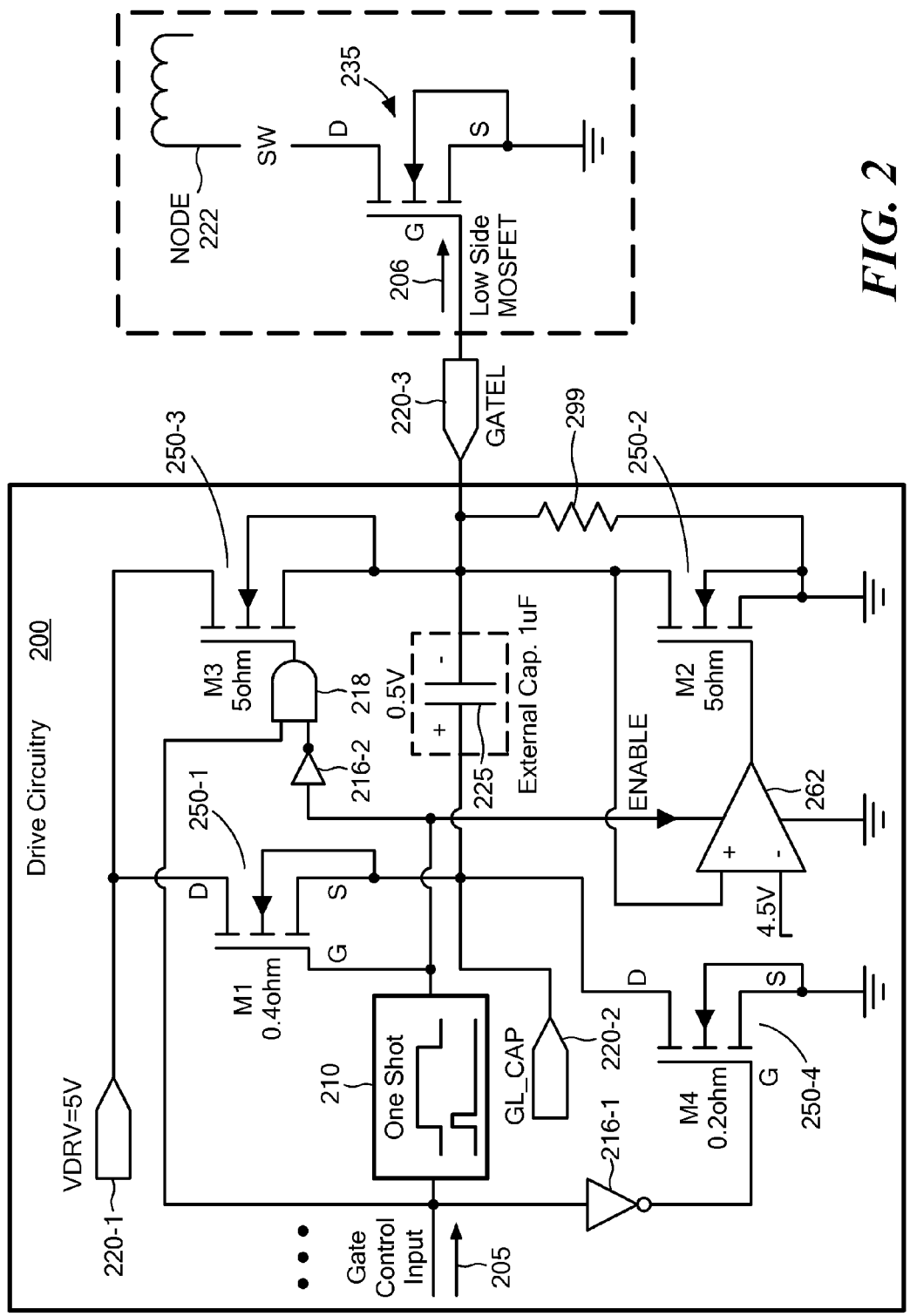
FIG. 2 is an example block diagram illustrating a drive circuit according to embodiments herein.

Now, more specifically, FIG. 2 is an example block diagram illustrating drive circuitry according to embodiments herein. As shown, driver circuitry 200 receives control signal 205 to control a state of switch 235. In one embodiment, switch 235 is disposed external to driver circuitry 200 (all or a portion of which can be an integrated circuit).

Figure 3:
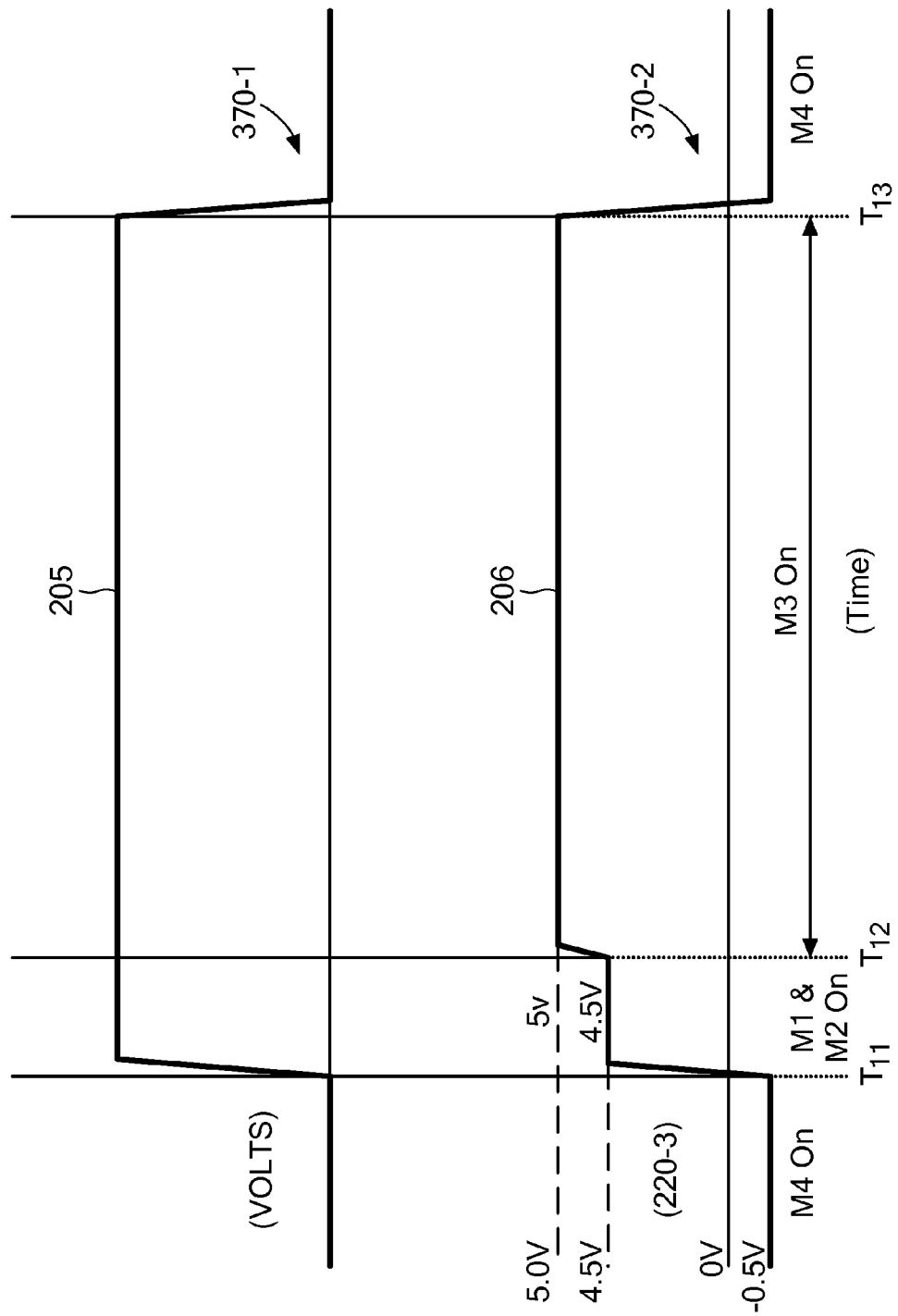
FIG. 3 is an example diagram illustrating a timing diagram of an input voltage and output voltage of driver circuitry according to embodiments herein.

In this example, graph 370-1 (FIG. 3) illustrates a state (voltage magnitude) of the control signal 205 as inputted by a respective controller to control driver circuitry 200. In one embodiment, the control signal 205 is received on an input pin of the driver circuitry 200 and indicates how to control the output voltage 206 as outputted from the output pin 220-3 (at pin labeled GATEL).

As discussed below, the control signal 205 controls states of the switches 250 (e.g., switch 250-1, switch 250-2, switch 250-3, and switch 250-4) in driver circuitry 200. States or settings of the switches (such as switch 250-1 and switch 250-2) control charging of the capacitor 225. In general, charging of the capacitor occurs between time T11 and time T12. Discharge of charge in the capacitor 225 occurs just after time T13 when the capacitor 225 absorbs the shoot-through current as received from the drain to gate capacitance $C_{GD}$ of external switch 235.

Graph 370-2 (FIG. 3) illustrates a magnitude of the output voltage 206 outputted from pin 220-3. The output voltage 206 drives the gate of external switch 235 to different ON and OFF states.

Prior to Time T11

Prior to time T11, as shown in graph 370-1, the control signal 205 (such as a received digital signal) is set to a logic low level. In such an instance, the low level causes inverter 216-1 to produce a high voltage output (such as 5 volts), causing switch 250-4 to turn ON. By way of non-limiting example, the $R_{DS}$ resistance of switch 250-4 can be 0.2 ohms in the ON state.

While switch 250-4 is set to an ON state, switch 250-1, switch 250-3, and switch 250-2 are all set to an OFF state. For example, the logic circuit 218 (AND logic) receives the logic zero from control signal 205 turning switch 250-3 to an OFF state. Pulse generator circuit 210 outputs a logic low level prior to time T11, setting the switch 250-1 to an OFF state. Additionally, operational-amplifier 262 drives switch 250-2 OFF.

Because only switch 250-4 is turned ON, the output voltage 206 at pin 220-3 of the driver circuit 200 is set to approximately the negative voltage (such as –0.5 volts) across capacitor 225. For example, switch 250-4 couples the positive end of capacitor 225 to ground. In such an instance, the output voltage 206 is approximately –0.5 volts. When the output voltage 206 applied to the gate of external switch 235 is –0.5 V prior to time T11, the external switch 235 is set to an OFF state.

Between Time T11 and T12

At or about time T11, the received control signal 205 becomes a logic high level. In response to receiving the logic high level, inverter 216-1 produces a low voltage output turning switch 250-4 to an OFF state.

The rising edge of the control signal 205 causes the pulse generator circuit 210 (such as a so-called one-shot circuit) to produce a pulse for a predetermined amount of time. In other words, as its name suggests, the pulse generator circuit 210 produces a pulse in response to detecting a low to high transition on the control signal 205. In one embodiment, the predetermined amount of time that a respective generated pulse is high is equal to the difference in time between T12 and T11. In this example embodiment, the pulse generator circuit 210 produces a logic high output between time T11 and T12. Thereafter, the output of pulse generator circuit 210 is a logic low.

The high voltage level of a respective pulse generated by pulse generator circuit 210 drives the gate of switch 250-1, causing it to turn ON between time T11 and time T12. Thus, between time T11 and time T12, the switch 250-1 is set to an ON state. By way of non-limiting example embodiment, the drain-source resistance of switch 250-1 can be a 0.4 ohm switch in the ON state.

The high voltage level of respective pulse generated by pulse generator circuit 210 also causes the inverter 216-2 to produce a logic low output between time T11 and T12. This causes the output of logic circuit 218 to produce a logic low output turning switch 250-3 OFF. Thus, between time T11 and time T12, when the pulse generated by pulse generator circuit 210 is high, the switch 250-3 is set to an OFF state. Thus, via the pulse generated from pulse generator circuit 210, the pulse generator circuit 210 disables activation of the switch 250-3 from turning to an ON state for the predetermined amount of time (between T11 and T12).

Activation of switch 250-1 to an ON state causes output voltage 206 to be approximately 4.5 volts (such as the difference between the 5 volt reference voltage applied to pin 220-1 minus the voltage across capacitor 225).

In addition to switch 250-1 being set to an ON state, switch 250-2 is also set to a controlled ON state between time T11 and time T12. By way of non-limiting example embodiment, switch 250-2 in the ON state can be 5.0 ohms. Between time T11 and time T12, activation of both switch 250-1 and switch 250-2 causes the capacitor 225 to charge to 0.5 volts. For example, note that when switch 250-1 and switch 250-2 are set to an ON state, the capacitor 225 resides in a series path connecting switch 250-1, capacitor 225, and switch 250-2 between the 5 volt reference (first reference voltage as received on power pin 220-1) and ground reference (second reference voltage received a second power pin of driver circuitry 200). The operational-amplifier 262 controls the ON status of switch 250-2 to maintain the output voltage level at output pin 220-3 to be 4.5V, thus the activation of the switches 250-1 and 250-2 charges the capacitor 225 to 0.5 volts.

Accordingly, pulse generator circuit 210 can be configured to receive control signal 205 indicating how to control a level of the output voltage 206 outputted from the output pin 220-3. The pulse generator circuit 210 turns both the switch 250-1 and switch 250-2 to an ON state to charge the capacitor 225 and set the level of the output voltage 206 to a first high level output state (such as 4.5 volts) for a predetermined amount of time (pulse time between time T11 and T12) in response to detecting a rising edge on the control signal 205 to turn the external switch 235 to an ON state. As previously discussed, the high level of 4.5 volts activates the external switch 235 to an ON state.

Between Time T12 and T13

At time T12, the pulse generated by pulse generator circuit 210 drops to a logic low level. This causes switch 250-1 to turn OFF. Also, the inverter 216-2 produces a logic high output inputted to logic circuit 218 in response to receiving the logic low level from pulse generator circuit 210. Logic circuit 218 produces a logic high output, causing switch 250-3 to turn ON. Thus, the pulse generator circuit 210 no longer disables switch 250-3 to an OFF state after time T12.

Because the switch 250-3 is set to an ON state, the output voltage 206 is substantially equal to the reference voltage such as 5 volts on pin 220-1 (as opposed to being only 4.5 volts as was the case between time T11 and time T12). Thus, the received control signal 205 causes the switch 250-3 to turn to an ON state to pull up the output voltage 206 to the voltage reference (5 volts) subsequent to the switch 250-1 and the switch 250-2 being turned to an OFF state. In other words, because the pulse generated by pulse generator circuit 210 drops to a logic low level after the pulse is over, the switch 250-1 and switch 250-2 turn OFF, switch 250-3 turns ON.

Thus, activation of the switch 250-3 to the ON state causes the level of the output voltage 206 to switch from a first high voltage output state (of 4.5 volts between time T11 and time T12) to a second high voltage output state (of 5 volts between time T12 and time T13). As previously discussed, both the first high voltage output state (4.5 volts) and the second high voltage output state (5.0 volts) of the output voltage 206 control the external switch 235 to an ON state.

Note further that operational amplifier 262 drives the gate of switch 250-2 with a low voltage between time T12 and T13, turning OFF switch 250-2. Thus, between time T12 and T13, only switch 250-3 is turned to an ON state.

After Time T13

At time T13, the control signal 205 transitions from a logic high to a logic low state. This transition to a logic low level causes the inverter 216-1 to output a logic high again to turn switch 250-4 to an ON state. For reasons as discussed above, the logic low state of control signal 205 also causes each of switch 250-1, switch 250-2, and switch 250-3 to turn OFF. Because switch 250-4 is set to an ON state, the output voltage 206 is set to the negative voltage (such as −0.5 volts) across capacitor 225. This causes the external switch 235 to turn OFF.

In one embodiment, just prior to the output voltage 206 transitioning from the high voltage level (such as 5 volts) to the low voltage (such as −0.5 volts) around time T13, the voltage at node 222 (i.e., drain of switch 235 labeled SW) is substantially 0 volts. In one non-limiting example embodiment, assume that just after time T13, after switch 235 turns OFF, the voltage at node 222 spikes up to a value such greater than 5 volts. In one embodiment, the voltage spikes transitions from 0 volts to a voltage such as 12 volts.

The transition of voltage at node 222 from a low voltage such as approximately ground to a voltage greater than 5 V around time T13 causes a CdV/dt current from the drain of switch 235 to pass to the gate of switch 235 via an inherent capacitance, $C_{GD}$, between the drain node of switch 235 and the gate node of switch 235. The negative voltage (−0.5 V) provided by capacitor 225 ensures that the external switch 235 does not inadvertently turn ON as a result of the voltage coupling. The capacitor 225 absorbs this so-called CdV/dt current, discharging a small portion of the charge on capacitor 225. Because the capacitance associated with capacitor 225 is substantially greater than the capacitance, $C_{GD}$, of the switch 235, there is minor or very little change to a magnitude of the voltage across the capacitor 225 after it absorbs the CdV/dt current.

Although the size of capacitor 225 can vary depending on the embodiment, in one embodiment, the capacitance associate with capacitor 225 is at least 5 times greater than the capacitance, $C_{GD}$.

As shown in graph 370-2, the range of magnitude (5 volts minus−0.5 volts=5.5 volts) of the output voltage 206 outputted from the pin 220-3 is greater than a difference between the 5 volt reference input and ground (0.0 volts). Thus, in one embodiment, even though the drive circuit 200 operates off a 5-volt reference and corresponding ground reference (such as 0 volts), the range (from one extreme to another) of the output voltage 206 is 5.5 volts as opposed to being only 5 volts.

In one embodiment, driver circuitry 200 can allow for more negative voltages with modifications to switch 250-1 (M1) and switch 250-2 (M2) body diode connections if the voltage across the capacitor 225 is increased further. Note that the body diode of switch 250-1 will conduct when switch 250-3 is turned ON. Similarly, the body diode of switch 250-2 will conduct when switch 250-4 (M4) is turned ON.

By way of non-limiting example, driver circuitry 200 requires an extra pin 220-2 and capacitor 225 such as a 1 uF capacitor. Switch 250-3 and switch 250-2 can be smaller devices with higher drain-source ON resistances (such as 5 ohms).

Driver circuitry 200 is shown with a 4.5V enabled active clamp. However, note that this could also be implemented as an open loop clamp and regulation could be controlled through one-shot duration.

High current capable switches 250-1 and 250-4 can be directly connected to pin 220-2 (GL_CAP). In one embodiment, several bond wires can be shared by switches 250-1 and 250-4.

In one embodiment, capacitor 225 can be "pre-charged" prior to first switching pulses to ensure no shoot thru events occur during power up.

If desired, driver circuitry 200 can include an internal GATEL bleed resistor 299.

Figure 4:
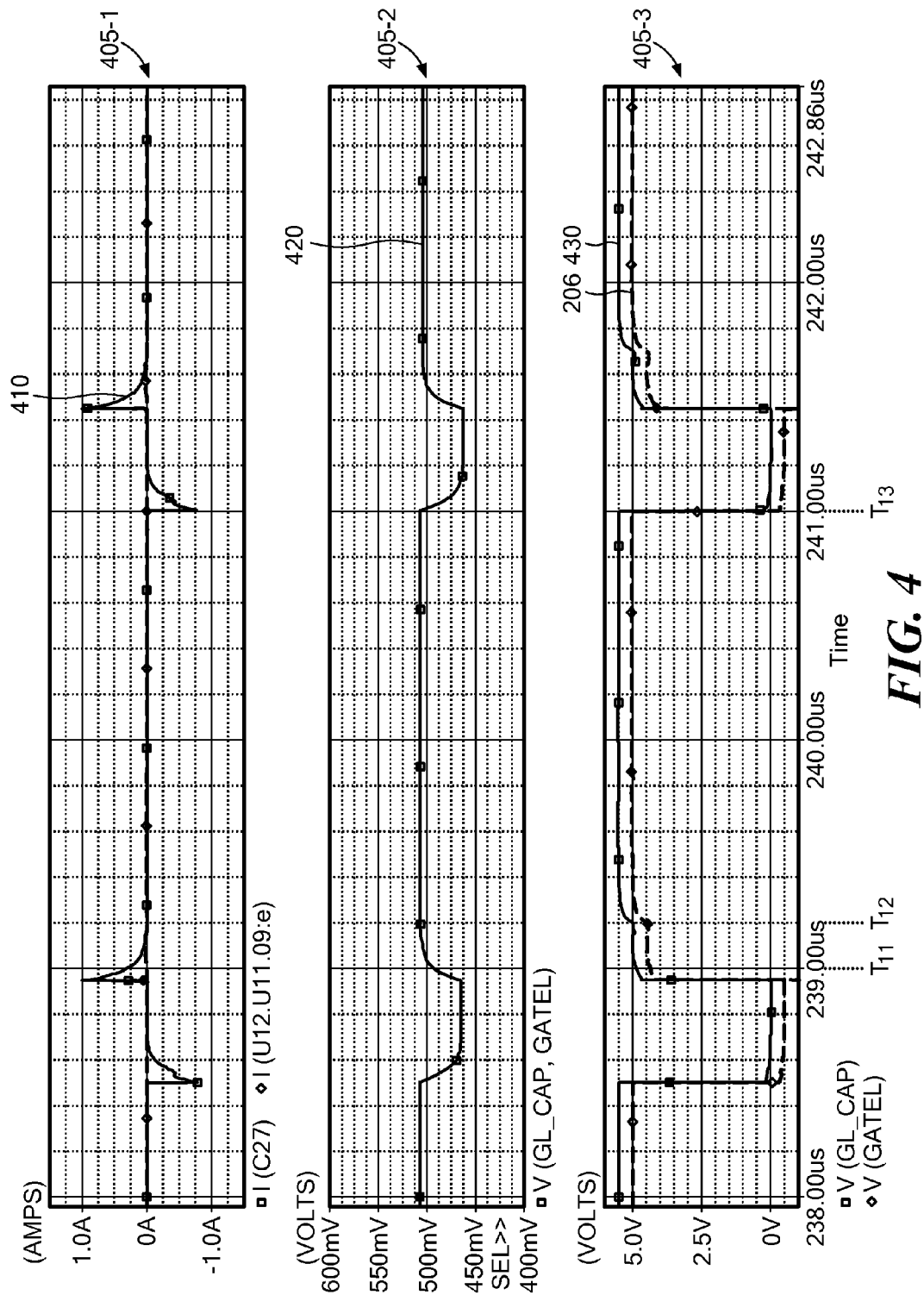
FIG. 4 is an example diagram illustrating a timing diagram of current and voltage associated with a proposed driver circuitry according to embodiments herein.

FIG. 4 is an example diagram illustrating a timing diagram of different simulated voltages associated with the driver circuitry according to embodiments herein.

Graph 405-1 illustrates current 410 passing through capacitor 225 over time. As previously discussed, the capacitor 225 is charged between time T11 and time T12. As shown, the capacitor 225 discharges a small amount just after time T13.

Graph 405-2 illustrates a magnitude of the voltage 420 across capacitor 225 over time.

Graph 405-3 illustrates a magnitude of the output voltage 206 (pin 220-3) and a magnitude of the voltage 430 at pin 220-2 over time.

Figure 5:
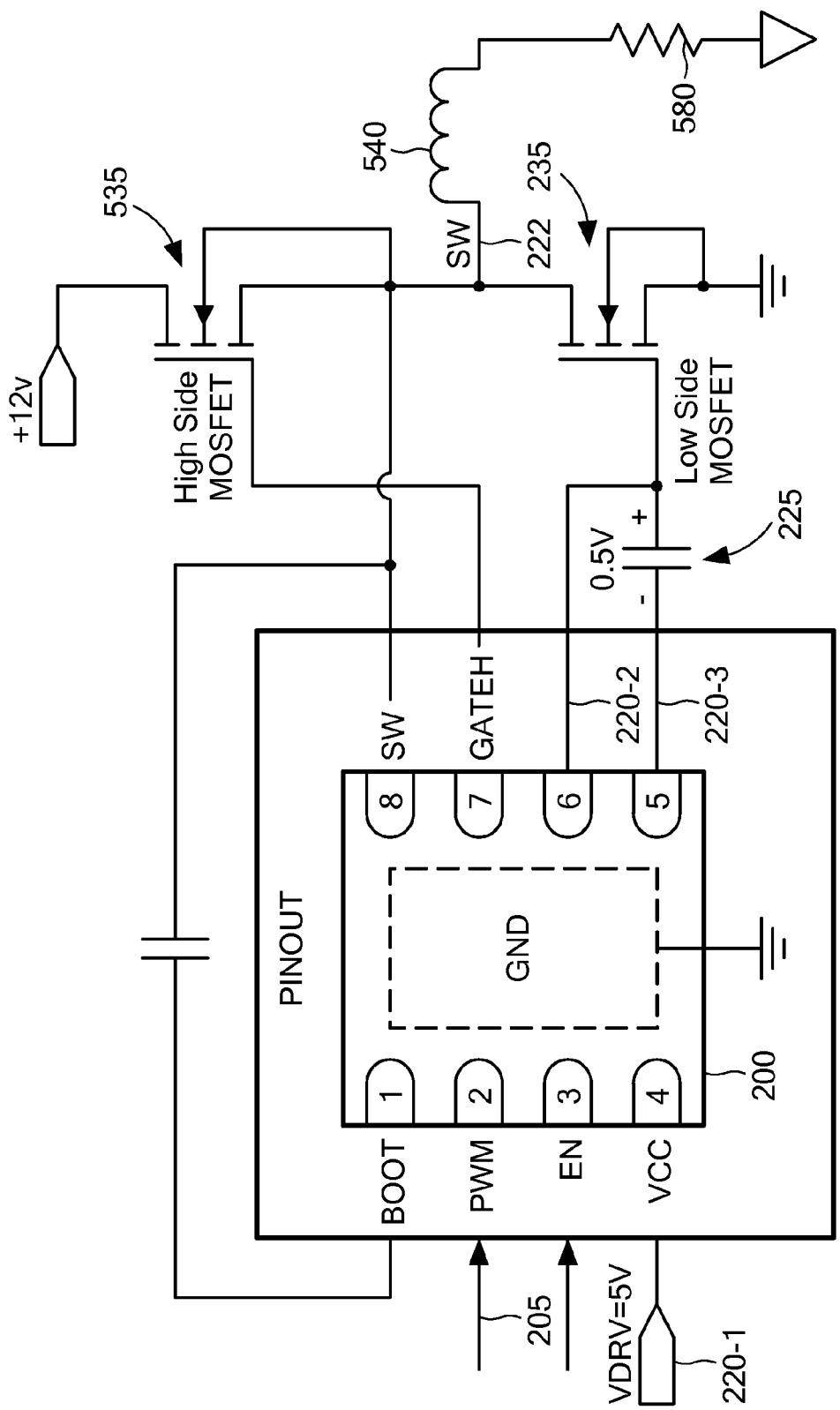
FIG. 5 is an example diagram illustrating implementation of a drive circuitry in a switching power supply application according to embodiments herein.

FIG. 5 is an example diagram illustrating implementation of a drive circuitry in a switching power supply application according to embodiments herein.

In one embodiment, the driver circuitry 200 is configured to drive a high side switch 535 (control switch) and a low side switch 235 (synchronous switch) in a respective switching power supply. During a first portion of a switching cycle, while switch 235 is OFF, the drive circuitry 200 activates switch 535 to an ON state to electrically connect a reference voltage such as a 12 volt input to node 222 of inductor 540. During a second portion of a switching cycle, while switch 535 is turned OFF, the drive circuitry 200 activates switch 235 to an ON state to electrically connect the node 222 to ground. In certain instances, both switches 235 and 535 may be controlled to an OFF state.

Switching between activation of the switch 535 and switch 235 at different times causes current to flow through inductor 540, powering load 580. When switch 535 and switch 235 are properly controlled, inductor 540 produces a substantially constant voltage to power load 580.

Figure 6:
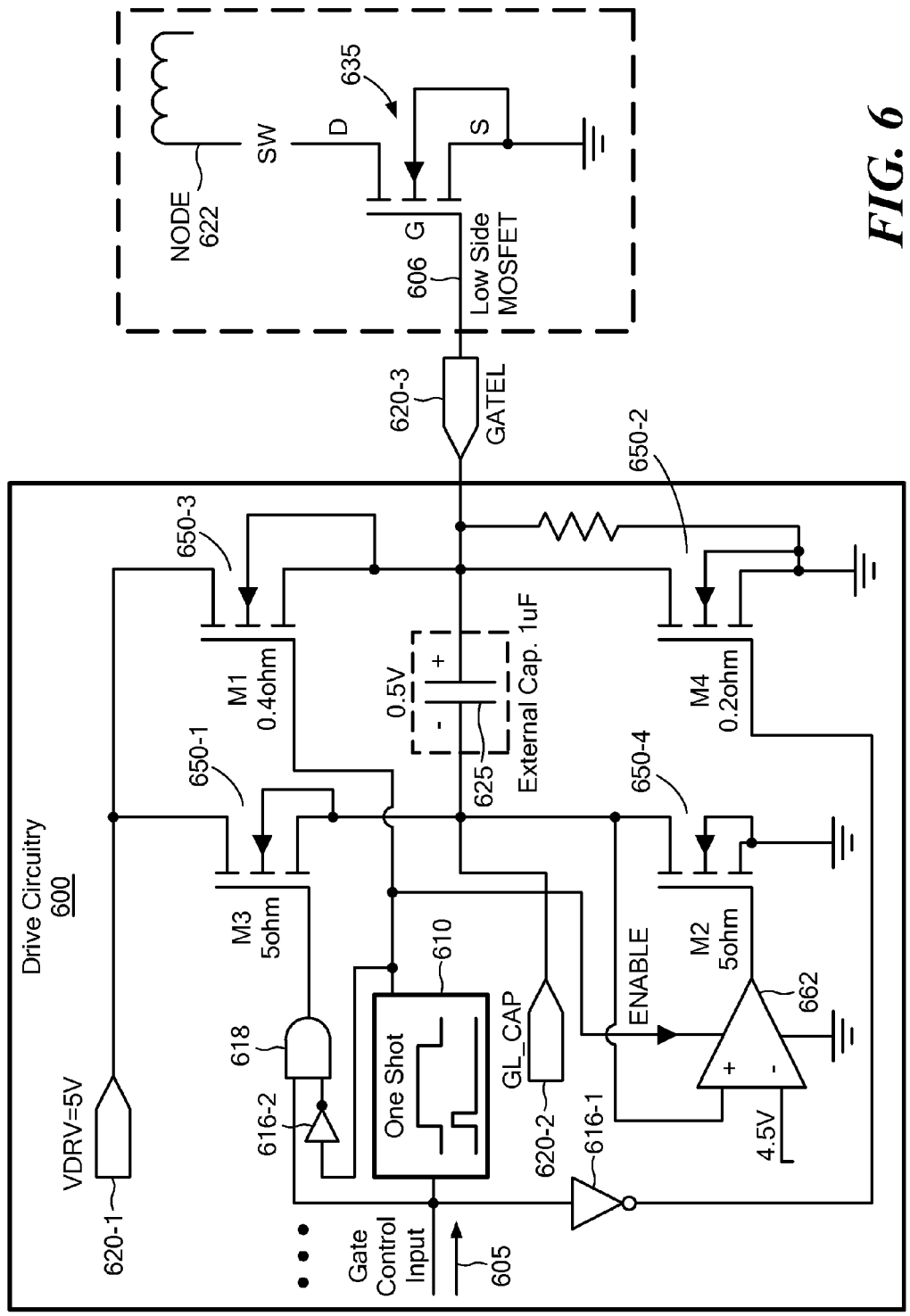
FIG. 6 is an example block diagram illustrating a drive circuit according to embodiments herein.

FIG. 6 is an example block diagram illustrating a drive circuit according to embodiments herein. As shown, driver circuitry 600 receives inputted control signal 605 to control a state of external switch 635.

Figure 7:
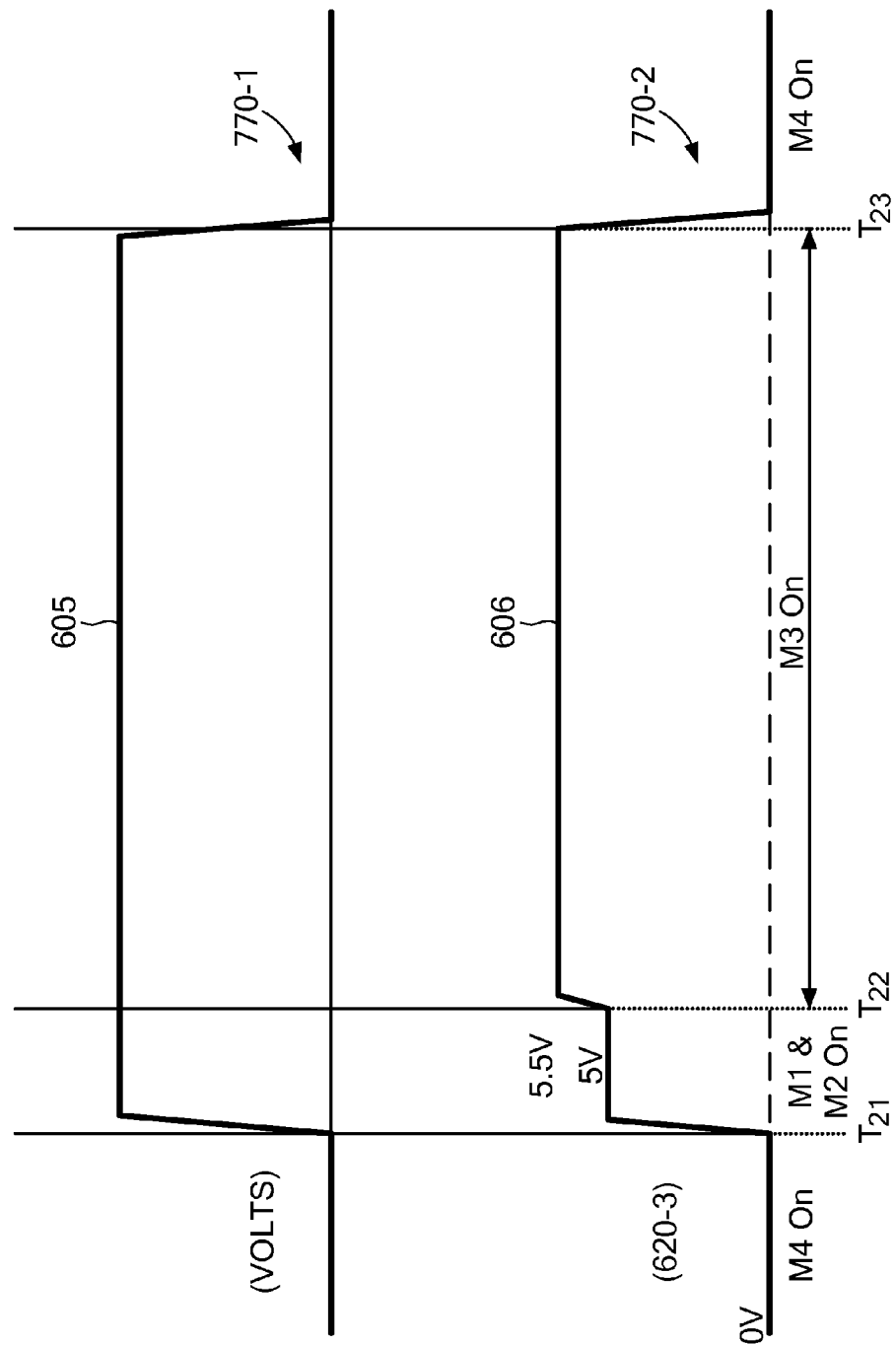
FIG. 7 is an example diagram illustrating a timing diagram of an input voltage and output voltage of driver circuitry according to embodiments herein.

In this example, graph 770-1 (FIG. 7) illustrates a state (voltage magnitude) of the input control signal 605 as inputted by a respective controller to control driver circuitry 600. In one embodiment, control signal 605 is received on an input pin of the driver circuitry 600. Control signal 605 indicates how to control a state of the output voltage 606 as outputted from the output pin 620-3 of driver circuitry 600.

As discussed below, the control signal 605 controls states of the switches 650 (e.g., switch 650-1, switch 650-2, switch 650-3, and switch 650-4) in driver circuitry 600. By way of non-limiting example, as further discussed below, states or settings of the switches (such as switch 650-3 and switch 650-4) control charging of the capacitor 625. In general, charging of the capacitor 625 occurs between time T21 and time T22.

Graph 770-2 (FIG. 7) illustrates a magnitude of the boosted output voltage 606 outputted from pin 620-3. The output voltage 606 drives the gate of external switch 635 to different ON and OFF states.

Prior to Time T21

Prior to time T21, the control signal 605 (such as a received digital signal) is set to a logic low level. In such an instance, the low level causes inverter 616-1 to produce a high voltage output (such as 5 volts), causing switch 650-2 to turn ON. By way of non-limiting example, the drain-source resistance of switch 650-2 can be 0.2 ohms in the ON state.

While switch 650-2 is set to an ON state, switch 650-1, switch 650-3, and switch 250-4 are all set to an OFF state.

For example, the logic circuit 618 (AND logic) receives the logic zero from control signal 605 turning switch 650-1 to an OFF state. Additionally, the output of pulse generator circuit 610 is logic low. Thus, operational-amplifier 662 drives switch 650-4 OFF. The logic low output of pulse generator circuit 610 turns switch 650-3 to an OFF state.

Because only switch 650-2 is turned ON prior to time T21, the output voltage 606 at pin 620-3 of the driver circuitry 200 is set to approximately zero volts (ground reference). Controlling the output voltage 606 to approximately 0.0 volts causes the external switch 635 to turn OFF.

Between Time T21 and T22

At or about time T21, the received control signal 605 becomes a logic high level as shown in graph 770-1. In response to receiving the logic high level, inverter 616-1 produces a low voltage output level, turning switch 650-2 to an OFF state.

The rising edge of the control signal 605 causes the pulse generator circuit 610 (such as a so-called one-shot circuit) to produce a pulse for a predetermined amount of time. In one embodiment, the predetermined amount of time is equal to the difference in time between T22 and T21. In this example embodiment, the pulse generator circuit 610 produces a logic high output between time T21 and T22. Thereafter, the output of pulse generator circuit 610 is a logic low.

The high voltage level pulse generated by pulse generator circuit 610 directly drives the gate of switch 650-3, causing it to turn ON between time T21 and time T22. Thus, between time T21 and time T22, the switch 650-3 is set to an ON state. By further way of non-limiting example embodiment, the drain-source resistance of switch 650-3 in the ON state can be a 0.4 ohm switch. Because switch 650-3 is set to an ON state, the output voltage 606 is pulled up to the reference voltage of 5 volts inputted on pin 620-1. This causes the external switch 635 to turn ON.

The high voltage level pulse generated by pulse generator circuit 610 also causes the inverter 616-2 to produce a logic low output. The logic low outputted form inverter 616-2 causes the output of logic circuit 618 to produce a logic low output turning switch 650-1 OFF. Thus, between time T21 and time T22, when the pulse generated by pulse generator circuit 610 is high, the switch 650-1 is set to an OFF state. Thus, via the generated pulse from pulse generator circuit 610, the pulse generator circuit 610 disables activation of the switch 650-1 from turning to an ON state for the predetermined amount of time (between T21 and T22).

As mentioned, activation of switch 650-3 to an ON state causes output voltage 206 to be approximately 5.0 volts. In addition to switch 650-3 being set to an ON state, the switch 650-4 is set to an ON state between time T21 and T22. For example, the output of pulse generator circuit 610 drives ENABLE input of the operational-amplifier 662 turning it ON. When ON, the operational-amplifier drives the gate of switch 650-4 turn ON to regulate 620-2 (GL_CAP) to 4.5V. By way of non-limiting example embodiment, in the ON state, the drain-source resistance of switch 650-4 can be 5.0 ohms.

Between time T21 and time T22, in addition to pulling output voltage 606 to 5.0 volts, activation of both switch 650-3 and switch 650-4 causes the capacitor 625 to charge to 0.5 volts. When switch 650-3 and switch 650-4 are set to an ON state, the capacitor 625 resides in a series path connecting switch 650-3, capacitor 625, and switch 650-4 between the 5 volt reference (first reference voltage received on power pin 620-1) and ground reference (second reference voltage received a second power pin of driver circuitry 600). This charges capacitor 625 to 0.5 volts.

Accordingly, pulse generator circuit 610 can be configured to receive control signal 605 indicating how to control a level of the output voltage 606 outputted from the output pin 620-3. The pulse generator circuit 610 causes both the switch 650-3 and switch 650-4 to turn to an ON state to charge the capacitor 625 and set the level of the output voltage 606 to a first high level output state (such as 5.0 volts) for a predetermined amount of time (pulse time) in response to detecting a rising edge on the control signal 605. As previously discussed, the high level of 5.0 volts of output voltage 606 between time T21 and time T22 activates the external switch 635 to an ON state. Between Time T22 and T23

At time T22, the pulse generated by pulse generator circuit 610 drops to a logic low level. This causes switch 650-3 to turn OFF. Additionally, note that the inverter 616-2 produces a logic high output level inputted to logic circuit 618 in response to receiving the logic low level from pulse generator circuit 610. Logic circuit 618 produces a logic high output, causing switch 650-1 to turn ON and pull up the voltage at 620-2 to 5.0 volts. Thus, after time T22, the pulse generated by pulse generator circuit 610 no longer disables switch 650-1 to an OFF state after time T22.

Note further that switch 650-2 is OFF between time T22 and T23 because the output of inverter 616-1 between time T22 and T23 is logic low.

Because the switch 650-1 is set to an ON state, and other switches are OFF, the output voltage 606 is substantially equal 5.5 volts between time T22 and time T23. For example, the output voltage 606 is equal to 5 volts (a reference voltage of 5 volts on pin 620-1) plus the 0.5 volts stored in capacitor 625. Source nodes of both switch 650-2 and 650-4 are referenced to a ground voltage (such as zero volts received on another pin of driver circuitry 600). Because the capacitor 625 is charged to 0.5 volts, turning switch 650-1 to the ON state increases the output voltage 606 from 5.0 volts to 5.5 volts between time T22 and T23, which is 0.5 volts above the reference voltage inputted to pin 620-1 (5.0 volts). Thus, the output voltage 606 on pin 620-3 is greater than the reference voltage 5.0 volts of pin 620-1 by an amount of voltage across a first node (− node) and a second node (+ node) of the capacitor 625.

Activation of the switch 650-1 to the ON state causes the level of the output voltage 606 to switch from a first high voltage output state (of 5.0 volts between time T21 and time T22) to a second high voltage output state (of 5.5 volts between time T22 and time T23). As previously discussed, both the first high voltage output state (5.0 volts) and the second high voltage output state (5.5 volts) of the output voltage 606 control the external switch 635 to an ON state.
After Time T23

At time T23, the control signal 605 transitions from a logic high level to a logic low level as shown in graph 770-1. This transition to a logic low level causes the inverter 616-1 to output a logic high again to turn switch 650-2 to an ON state again. The logic low state of control signal 605 also causes each of switch 650-1, switch 650-3, and switch 650-4 to turn OFF. Because switch 650-2 is set to an ON state again, the output voltage 606 is set to zero volts. In such an instance, the external switch 635 is turned OFF.

In one non-limiting example embodiment, just prior to the output voltage 606 transitioning from the high voltage level (such as 5.5 volts) to the low voltage (such as 0 volts) around time T23, the voltage at node 622 (i.e., drain of switch 635) is substantially 0 volts. Just after time T23, after switch 635 turns OFF, assume that the voltage at node 622 spikes up to a value such as greater than 5 volts. In one embodiment, the voltage spikes transitions from 0 volts to a value such as 12 volts at or around time T23.

The transition of voltage at node 622 from a low voltage such as approximately ground to a voltage greater than 5 volts around time T23 causes a CdV/dt current from the drain of switch 635 to pass to the gate of switch 635 via an inherent capacitance, $C_{GD}$, between the drain node of switch 635 and the gate node of switch 635. Setting of switch 650-2 to an ON state (and because switch 650-2 is 0.2 ohms when ON, a low $R_{DS}$) helps to ensure that the external switch 635 does not inadvertently turn ON as a result of this shoot-through current.

As shown in graph 770-2, the range (5.5 volts minus−0.0 volts=5.5 volts) of magnitude of the output voltage 606 outputted from the pin 620-3 is greater than a difference between the 5-volt reference input and ground (0.0 volts). Thus, in one embodiment, even though the drive circuit 600 operates off a 5-volt reference and corresponding ground reference (such as 0 volts), the range (from one extreme to another) of the output voltage 606 is a larger range (such as 5.5 volts) than a range of the voltages off which the driver circuitry 600 is powered.

In one embodiment, driver circuitry 600 can allow for larger boost voltages (e.g., 5.5 volt or higher output high levels). However, note this circuit will require higher voltage driver devices. Also, modifications to switch 650-3 and switch 650-4 body diode connections may be needed if the voltage across the external capacitor 625 is increased further.

Driver circuitry 600 can include an extra pin and 0.1 uF capacitor 625 (external circuitry in dashed boxes). Switch 650-1 and switch 650-4 can be smaller devices (5 ohms suggested below) as their switch current is much smaller due to lower dV. This provides a 40 mA replenishment peak current.

Driver circuitry 600 is shown with a 4.5V enabled clamp. However, this could also be implemented as an open loop clamp and regulation could be controlled through one-shot duration.

High current switches 650-2 and 650-3 can be directly connected to pin 620-3 (GATEL). Several bond wires (such as 3-4 bond wires) can be shared by switches 650-2 and 650-3.

In one embodiment, the capacitor 625 is ideally "precharged" prior to first switching pulses, but is not absolutely required.

Figure 8:
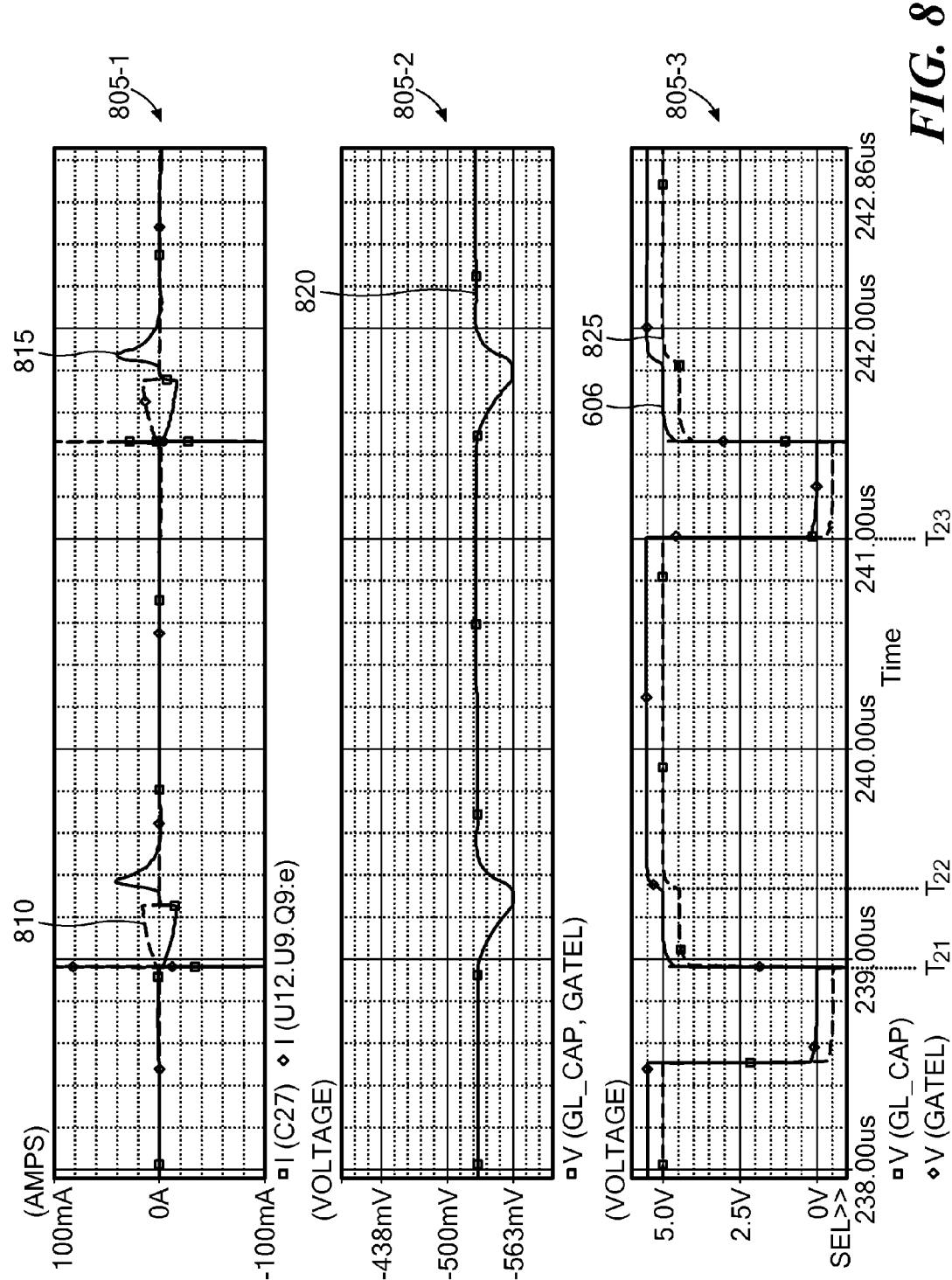
FIG. 8 is an example diagram illustrating a timing diagram of current and voltages associated with components in a proposed driver circuitry according to embodiments herein.

FIG. 8 is an example diagram illustrating a timing diagram of current and different simulated voltages associated with the driver circuitry according to embodiments herein.

Graph 805-1 illustrates a magnitude of series capacitor current 810 passing through capacitor 625 over time. As previously discussed, the capacitor 625 is charged between time T21 and time T22. Graph 805-1 also illustrates a magnitude of the current 815 (the 4.5 volt clamp current) needed to replenish the capacitor charge of capacitor 625.

Graph 805-2 illustrates a magnitude of the voltage 820 across capacitor 625 over time.

Graph 805-3 illustrates a magnitude of the output voltage 606 (GATEL) at pin 620-3 with respect to a magnitude of the voltage 825 (GL_CAP) at pin 620-2 over time.

Figure 9:
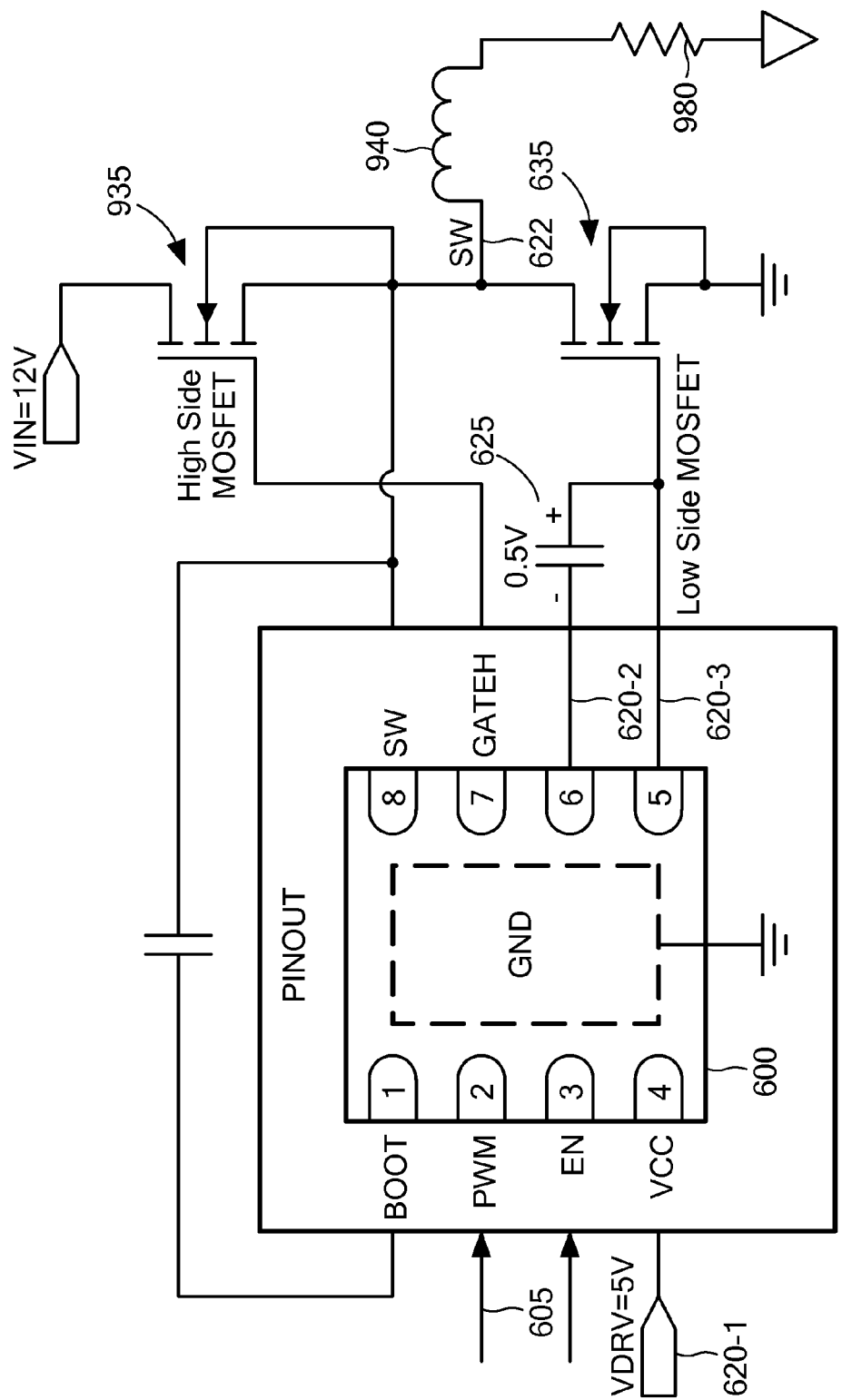
FIG. 9 is an example diagram illustrating implementation of a drive circuitry in a switching power supply application according to embodiments herein.

FIG. 9 is an example diagram illustrating implementation of a drive circuitry in a switching power supply application according to embodiments herein.

As shown in FIG. 9, the driver circuitry 600 can be configured to drive a high side switch 935 (control switch) and a respective external switch 635 (low side switch or synchronous switch) in a respective switching power supply. During a first portion of a switching cycle, while switch 635 is OFF, the drive circuitry 600 activates switch 935 to an ON state to electrically connect a reference voltage such as a 12 volt input to node 622 of inductor 940. During a second portion of a switching cycle, while switch 935 is turned OFF, the drive circuitry 600 activates switch 635 to an ON state to electrically connect the node 622 to ground. In certain instances, both switches 635 and 935 may be controlled to an OFF state.

Switching between activation of the switch 935 and switch 635 causes current to flow through inductor 940, powering load 980. When switch 935 and switch 635 are properly controlled ON and OFF at different times, inductor 940 produces a substantially constant voltage to power load 980.

Figure 10:
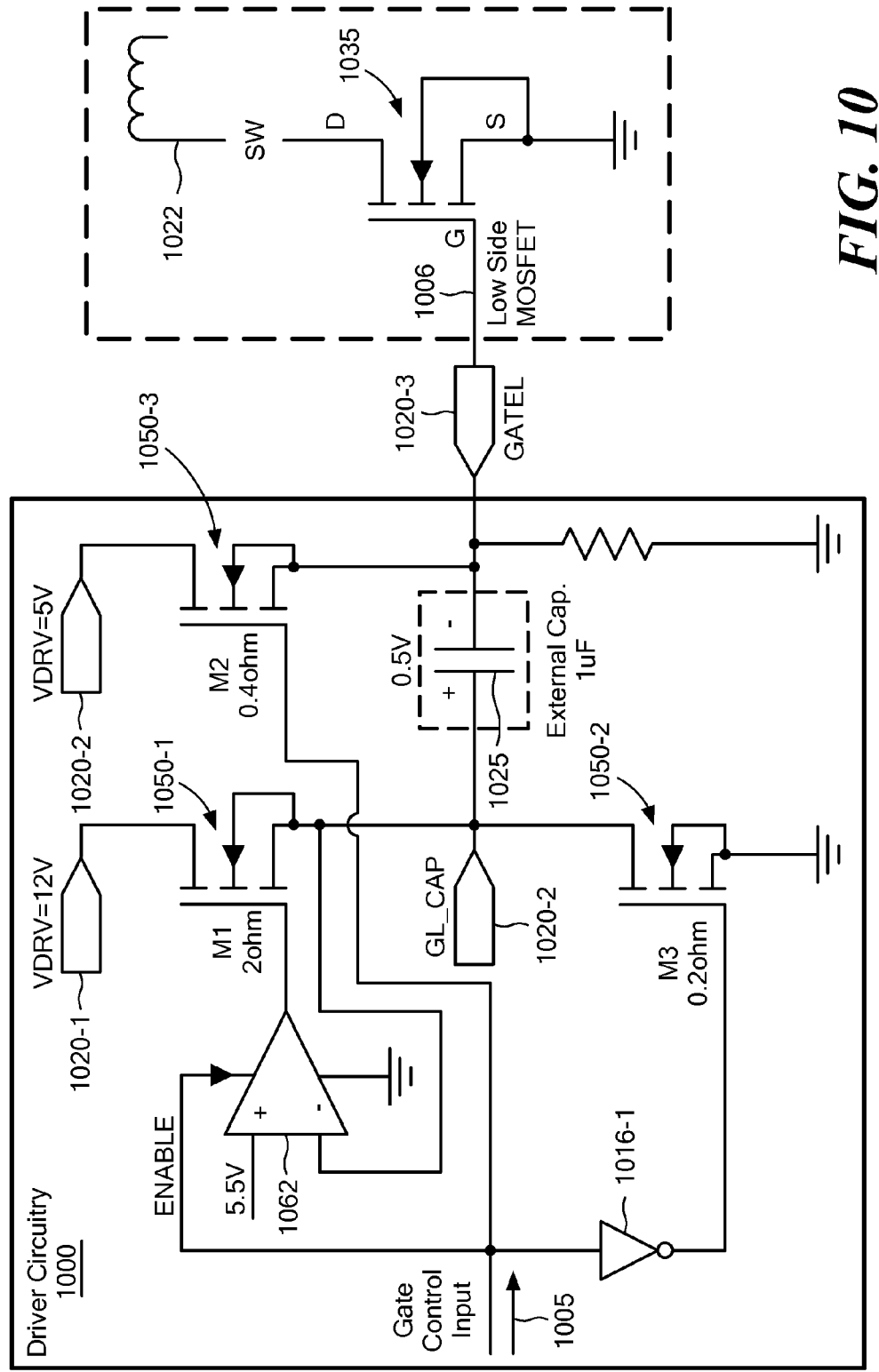
FIG. 10 is an example block diagram illustrating a drive circuit according to embodiments herein.

FIG. 10 is an example block diagram illustrating a drive circuit according to embodiments herein. As shown, driver circuitry 1000 receives inputted control signal 1005 to control a state of external switch 1035.

Figure 11:
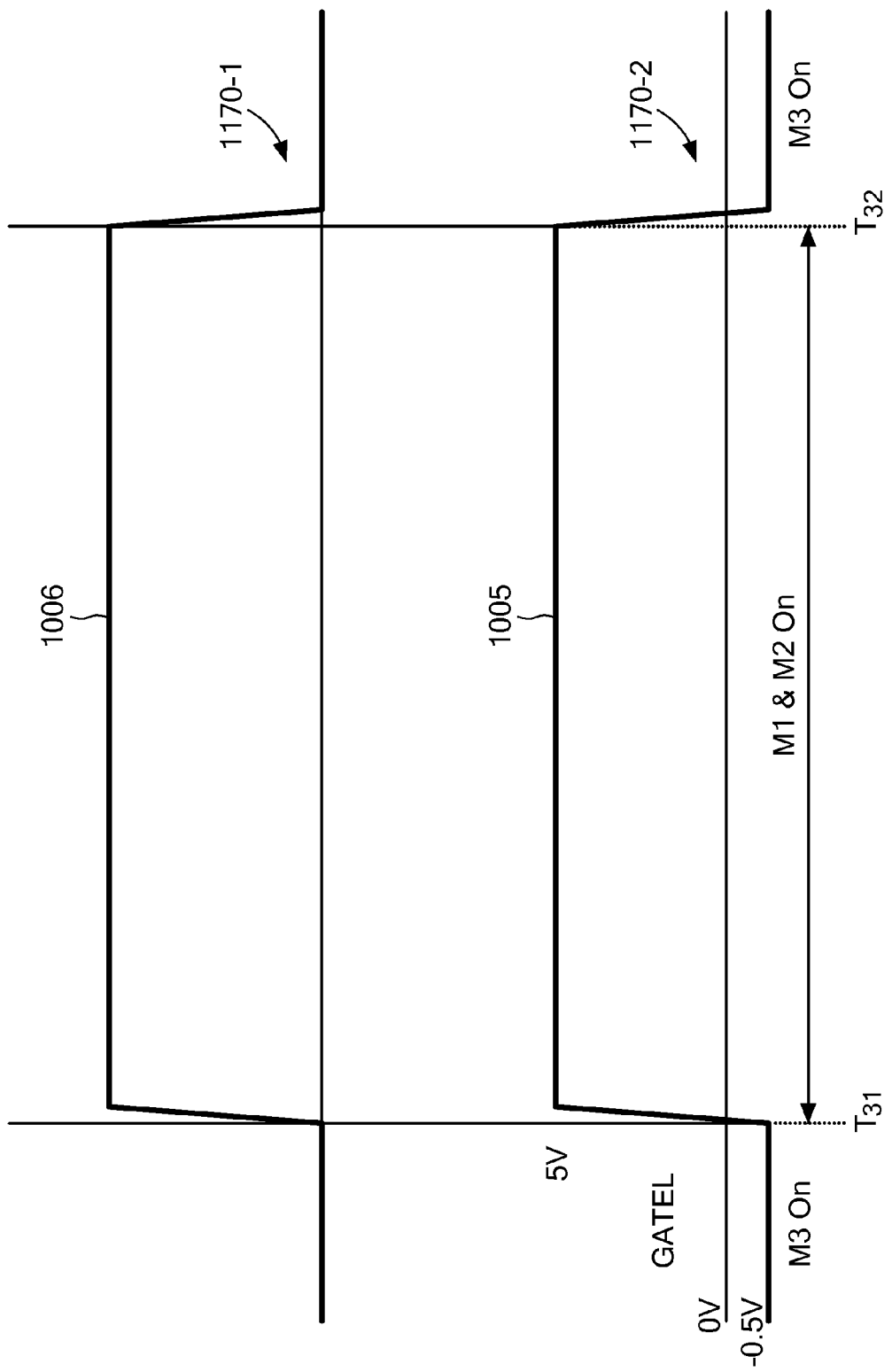
FIG. 11 is an example diagram illustrating a timing diagram associated with a driver circuitry according to embodiments herein.

In this example, graph 1170-1 (FIG. 11) illustrates a state (voltage magnitude) of the input control signal 1005 as inputted by a respective controller to control driver circuitry 1000. In one embodiment, control signal 1005 is received on an input pin of the driver circuitry 1000. Control signal 1005 indicates how to control the output voltage 1006 as outputted from the output pin 1020-3 of driver circuitry 1000.

As discussed below, the control signal 1005 controls states of the switches 1050 (e.g., switch 1050-1 and switch 1050-2) in driver circuitry 1000. By way of non-limiting example, as further discussed below, states or settings of the switches (such as switch 1050-1 and switch 1050-3) control charging of the capacitor 1025 and a setting of a magnitude of the output voltage 1006. In general, charging of the capacitor 1025 occurs between time T31 and time T32. A portion of the charge on capacitor 1025 is discharged subsequent to time T32.

Graph 1170-2 (FIG. 11) illustrates a magnitude of the output voltage 1006 outputted from pin 1020-3 of driver circuitry 1000. As shown in FIG. 10, the output voltage 1006 drives the gate of external switch 1035 to different ON and OFF states.

Prior to Time T31

Prior to time T31, the control signal 1005 (such as a received digital signal) is set to a logic low level. In such an instance, the low level causes inverter 1016-1 to produce a high voltage output (such as 5 volts), causing switch 1050-2 to turn ON. By way of non-limiting example, the drain-source of switch 650-2 can be 0.2 ohms in the ON state.

While switch 1050-2 is set to an ON state, switch 1050-1 and 1050-3 are both set to an OFF state. For example, when the control signal 1005 is logic low, the enable signal inputted to operational amplifier 1062 is low, disabling the operational amplifier 1062. This causes the switch 1050-1 to turn OFF. Additionally, because the control signal 1005 is set to logic low before time T31, the logic low level of control signal 1005 directly controls switch 1050-3 to an OFF state.

Because only switch 1050-2 is turned ON prior to time T31, the output voltage 1006 at pin 1020-3 of the driver circuit 1000 is set to approximately −0.5 volts (e.g., the voltage across capacitor 1025). As previously discussed, controlling the output voltage 1006 to approximately −0.5 volts causes the external switch 635 to turn OFF.

Between Time T31 and T32

At or about time T31, the received control signal 1005 becomes a logic high level as shown in graph 1170-1. In response to receiving the logic high level, inverter 1016-1 produces a low voltage output level, turning switch 1050-2 to an OFF state.

Additionally, the logic high level of the received control signal 1005 between time T31 and time T32 causes both switch 1050-1 and switch 1050-3 to turn ON. For example, the control signal 1005 is directly connected to an enable input of the operational amplifier 1062. When the control signal 1005 is a logic high, the operational amplifier 1062 is turned to an ON state. When the operational amplifier 1062 is enabled, the operational amplifier output controls the gate of the switch 1050-1 to regulate 1020-2 (GL_CAP) to 5.5V. This causes the switch 1050-1 to turn ON.

In the ON state, the drain to source resistance of switch 1050-1 can be a value such as 2 ohms. As shown, the drain of switch 1050-1 is coupled to pin 1020-1 (such as a 12 volt reference) of driver circuitry 1000. Thus, when switch 1050-1 is controlled by the operational amplifier, the voltage of pin 1020-2 becomes set to 5.5 volts.

Additionally, as previously discussed, the control signal 1005 directly controls a gate of switch 1050-3. Thus, when the control signal 1005 is set to a logic high level between time T31 and time T32, switch 1050-3 is turned ON. Thus, between time T31 and T32, both switches 1050-1 and 1050-2 are set to an ON state.

In the ON state, the drain to source resistance of switch 1050-3 can be a value such as 0.4 ohms. The drain of switch 1050-3 is coupled to pin 1020-2 (such as a 5 volt reference) of driver circuitry 1000. Thus, when switch 1050-3 is turned ON, this causes the voltage of pin 1020-3 to be set to 5.0 volts.

In addition to controlling the output voltage 1006 to a voltage of approximately 5.0 volts, simultaneous activation of switch 1050-1 and switch 1050-3 charges capacitor 1025. For example, as previously discussed, the logic high level of the control signal 1006 causes both the switch 1050-1 and the switch 1050-2 to be activated to an ON state. The switch 1050-1 pulls up the first node of the capacitor 1025 to a first voltage level such as approximately 5.5 volts; the switch 1050-3 pulls up the second node of the capacitor 1025 to a second voltage level such as approximately 5.0 volts. Thus, by way of non-limiting example, turning ON both switches 1050-1 and switch 1050-3 causes the capacitor 1025 to be charged to 0.5 volts.

After Time T32

As shown, at time T32, the control signal 1005 transitions from a logic high level to a logic low level. This transition to a logic low level causes the inverter 1016-1 to output a logic high again to turn switch 1050-2 to an ON state again. In a manner as previously discussed, the logic low state of control signal 1005 also causes each of switch 1050-1 and switch 1050-3 to turn OFF. Because switch 1050-2 is set to an ON state again, the output voltage 1006 is set to −0.5 volts. That is, activation of the switch 1050-2 causes the output voltage 1006 at pin 1020-3 to be driven to a negative value based on a voltage (−0.5 volts) across the first node and second node of the capacitor 1025. In such an instance, the external switch 1035 is turned OFF.

In one non-limiting example embodiment, just prior to the output voltage 1006 transitioning from the high voltage level (such as 5.5 volts) to the low voltage (such as 0 volts) around time T32, the voltage at node 1022 (i.e., drain of switch 1035) is substantially 0 volts. In one embodiment, assume that just after time T32, after switch 1035 turns OFF, the voltage at node 1022 spikes up to a value such as greater than 5 volts. In one embodiment, the voltage spikes transitions from 0 volts to a voltage such as 12 volts at or around time T32.

The transition of voltage at node 1022 from a low voltage such as approximately ground to a voltage greater than 5 V around time T32 causes a CdV/dt current from the drain of switch 1035 to pass to the gate of switch 1035 via an inherent capacitance, $C_{GD}$, between the drain node of switch 1035 and the gate node of switch 1035. The negative voltage (−0.5 V) provided by capacitor 1025 ensures that the external switch 1035 does not inadvertently turn ON as a result of CdV/dt current. The capacitor 1025 absorbs the CdV/dt current, dissipating a portion of the charge on capacitor 1025. In one embodiment, because the capacitance associated with capacitor 1025 is substantially greater than the capacitance, $C_{GD}$, of the switch 1035, there is very little change to a magnitude of the voltage across the capacitor 1025 after it absorbs the CdV/dt current.

Although the size of capacitor 1025 can vary depending on the embodiment, in one embodiment, the capacitance associated with capacitor 1025 is at least 5 times greater than the capacitance, $C_{GD}$.

As shown in graph 1170-2, the range (5 volts −0.5 volts=5.5 volts) of magnitude of the output voltage 1006 outputted from the pin 1020-3 is greater than a difference between the 5 volt reference input and ground (0.0 volts). Thus, in one embodiment, even though the drive circuit 1000 operates off a 5 volt reference and corresponding ground reference (such as 0 volts), the range (from one extreme to another) of the output voltage 1006 is 5.5 volts.

In one embodiment, the charge pump is driven from VIN to force a voltage across the external capacitor 1025 as pin 1020-3 (GATEL) is driven to 5V. Switches 1050-2 and 1050-3 can be larger devices with lower ON resistances.

In one embodiment, driver circuitry 1000 requires an extra pin and 1 uF capacitor 1025 (external circuitry in dashed boxes). Switch 1050-1 can be a smaller device (such as 2 ohms suggested below). Full GATEL RMS charge current is seen by switch 1050-1, resulting in lower efficiency as bias originates from 12V. The RMS current of the 5V input at switch 1050-3 ends up being approximately zero volts as the 1 uF capacitor replenishment current is fed back into the 5V supply.

By way of non-limiting example, in one embodiment, high current switches 1050-2 and 1050-3 are not connected to the same bond pad and do not share bond wires.

If desired, in one embodiment, the capacitor 1025 can be ideally "pre-charged" prior to first switching pulses.

Figure 12:
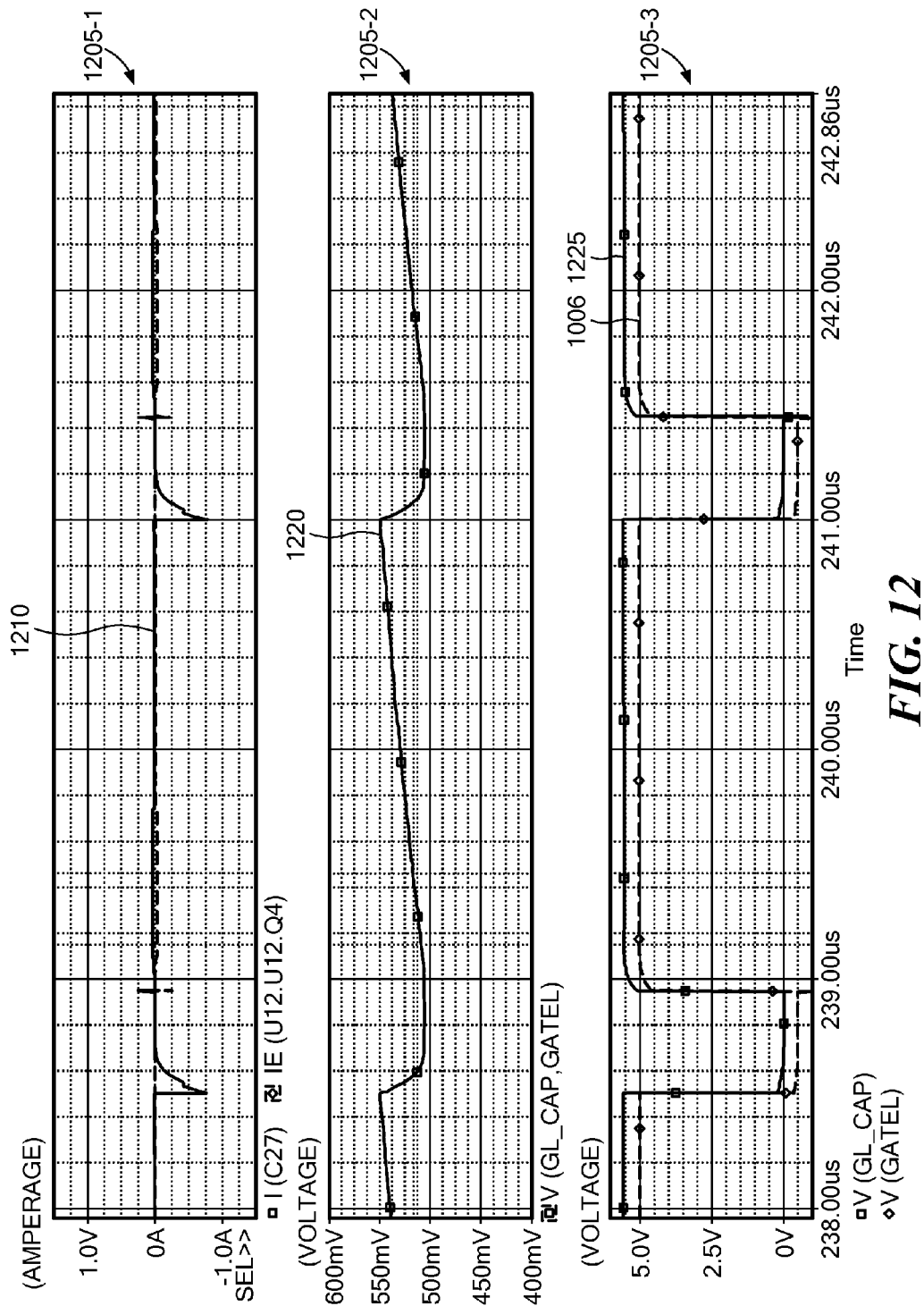
FIG. 12 is an example diagram illustrating a timing of current and voltages in a proposed driver circuitry according to embodiments herein.

FIG. 12 is an example diagram illustrating a timing diagram of different simulated voltages associated with the driver circuitry according to embodiments herein.

Graph 1205-1 illustrates a magnitude of series capacitor current 1210 passing through capacitor 1025 over time. As previously discussed, the capacitor 1025 is charged between time T31 and time T32.

Graph 1205-2 illustrates a magnitude of the voltage 1220 across nodes of capacitor 1025 over time.

Graph 1205-3 illustrates a magnitude of the output voltage 1006 with respect to a magnitude of the voltage 1225 at pin 1020-2 over time.

Figure 13:
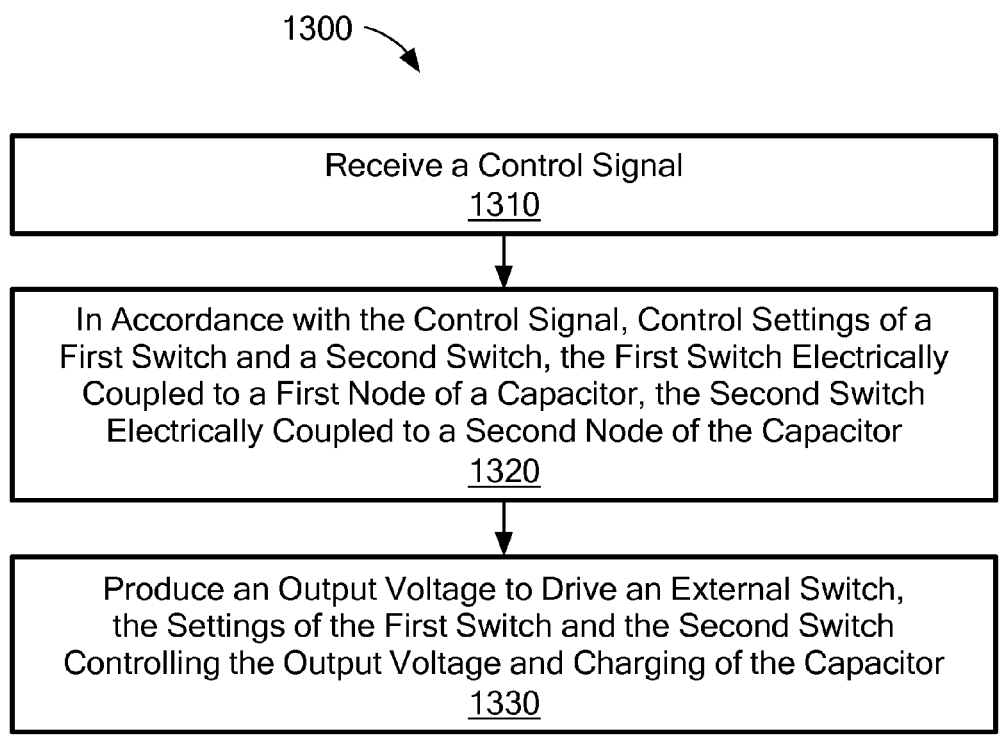
FIG. 13 is an example diagram illustrating a method according to embodiments herein.

FIG. 13 is a flowchart 1300 illustrating an example method according to embodiments. Note that there will be some overlap with respect to concepts as discussed above.

In processing block 1310, a driver circuitry receives a control signal.

In processing block 1320, in accordance with the received control signal, the driver circuitry controls settings of a first switch and a second switch, the first switch electrically coupled to a first node of a capacitor, the second switch electrically coupled to a second node of the capacitor.

In processing block 1330, the driver circuitry produces an output voltage to drive an external switch, the settings of the first switch and the second switch controlling the output voltage and charging of the capacitor.

Note again that techniques herein are well suited for use in driver circuitry such as those used to drive low side switch in a switching power supply. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A driver circuitry comprising:
   a capacitor, the capacitor including a first node and a second node;
   an output pin operable to drive an external switch with respect to the driver circuitry, the second node electrically coupled to the output pin;

a first switch, the first switch electrically coupled to the first node of the capacitor;

a second switch, the second switch electrically coupled to the second node of the capacitor, settings of the first switch and the second switch controlling an output voltage outputted from the output pin, simultaneous activation of the first switch and the second switch charging the capacitor; and an input in to receive a control signal, a first state of the control signal initiating simultaneous activation of the first switch and the second switch to an ON state to charge the capacitor.

2. The driver circuitry as in claim 1, wherein the control signal indicates how to control the voltage level outputted from the output pin.

3. The driver circuitry as in claim 2, wherein a combination of the first switch, capacitor, and the second switch forms a series connection path between a first voltage reference and a second voltage reference inputted to the driver circuitry.

4. The driver circuitry as in claim 1 further comprising:

a first power pin to receive a first voltage reference;

a second power pin to receive a second voltage reference; and wherein a range of magnitude of the output voltage outputted from the output pin is greater than a difference between the second voltage reference and the first voltage reference.

5. The driver circuitry as in claim 1 further comprising:

a first power pin to receive a first voltage reference;

a second power pin to receive a second voltage reference, a magnitude of voltage provided by the first voltage reference being greater than a magnitude of voltage provided by the second voltage reference; and a third switch, the third switch electrically coupled to the second node of the capacitor, the received control signal causing the third switch to turn to an ON state to electrically connect the output pin to the first voltage reference subsequent to the first switch and the second switch being turned to an OFF state.

6. The driver circuitry as in claim 1 further comprising:

a first power pin to receive a first voltage reference;

a second power pin to receive a second voltage reference, a magnitude of voltage provided by the first voltage reference being greater than a magnitude of voltage provided by the second voltage reference; and wherein a received control signal causes the second switch to turn to an ON state to increase the voltage outputted from the output pin to a level greater than the first voltage reference.

7. The driver circuitry as in claim 6, wherein voltage outputted from the output pin is greater than the first voltage reference by an amount of voltage across the first node of the second node in the capacitor.

8. The driver circuitry as in claim 1, wherein the first state of the received control signal causes both the first switch and the second switch to be activated to the ON state, the first switch pulling up the first node of the capacitor to a first voltage level, the second switch pulling up the second node of the capacitor to a second voltage level, the first voltage level greater than the second voltage level.

9. The driver circuitry as in claim 8 further comprising:

a third switch, the third switch activated to an ON state based on receipt of the control signal that also deactivates both the first switch and the second switch to an OFF state, activation of the third switch to the ON state causing the voltage of the output pin to be driven to a negative value based on a voltage across the first node and second node of the capacitor.

10. A driver circuitry comprising:

a capacitor, the capacitor including a first node and a second node;

an output pin operable to drive an external switch with respect to the driver circuitry, the second node electrically coupled to the output pin;

a first switch, the first switch electrically coupled to the first node of the capacitor;

a second switch, the second switch electrically coupled to the second node of the capacitor, settings of the first switch and the second switch controlling an output voltage outputted from the output pin, simultaneous activation of the first switch and the second switch charging the capacitor; and a pulse generator circuit configured to receive signal indicating how to control a level of the voltage outputted from the output pin, the pulse generator circuit turning both the first switch and the second switch to an ON state to charge the capacitor and set the level of the output voltage to a first high level output state for a predetermined amount of time in response to detecting a rising edge on the control signal to turn the external switch to an ON state, the first high level output state activating the external switch.

11. The driver circuitry as in claim 10, further comprising:

a third switch, the third switch coupled to the first node of the capacitor;

a fourth switch, the fourth switch coupled to the second node of the capacitor, and wherein the pulse generator circuit disables activation of the fourth switch to the ON state for the predetermined amount of time, after which the pulse generator circuit causes the first switch and the second switch to turn OFF and the fourth switch to turn ON.

12. The driver circuitry as in claim 11, wherein activation of the fourth switch to the ON state causes the level of the output voltage to switch to a second high output state, the second high output state being greater than the first high output state, both the first high output state and the second high output state of the output voltage controlling the external switch to an ON state.

13. A method comprising:

receiving a control signal;

in accordance with the control signal, controlling settings of a first switch and a second switch, the first switch electrically coupled to a first node of a capacitor, the second switch electrically coupled to a second node of the capacitor; and producing an output voltage to drive an external switch, the settings of the first switch and the second switch controlling the output voltage and charging of the capacitor;

wherein the driver circuitry is powered by a first voltage reference and a second voltage reference;

wherein producing the output voltage includes: producing a range of magnitude of the output voltage to be greater than a difference between the second voltage reference and the first voltage reference; and the method further comprising, in response to detecting an edge on the control signal to turn the external switch to an ON state, generating a signal to turn both the first switch and the second switch to an ON state to charge the capacitor and set the level of the output voltage to a first high output state for a predetermined amount of time, the first high output state activating the external switch.

14. The method as in claim 13,
wherein a combination of the first switch, capacitor, and the second switch is connected in series between the first voltage reference and the second voltage reference inputted to the driver circuitry.

15. The method as in claim 13 further comprising:
disabling activation of a third switch and a fourth switch to an ON state in the driver circuitry for the predetermined amount of time while the first switch and the second switch are activated to an ON state, the third switch coupled to the first node of the capacitor, the fourth switch coupled to the second node of the capacitor, and
after the predetermined amount of time: i) enabling activation of the third switch to an ON state, and ii) deactivating the first switch and the second switch to an OFF state.

16. The method as in claim 13 further comprising:
receiving the first voltage reference to power the driver circuitry;
receiving the second voltage reference to power the driver circuitry, a magnitude of voltage provided by the first voltage reference being greater than a magnitude of voltage provided by the second voltage reference; and
controlling a third switch in the driver circuitry, the third switch electrically coupled to the second node of the capacitor, the received control signal causing the third switch to turn to an ON state to electrically connect the output pin to the first voltage reference subsequent to the first switch and the second switch being turned to an OFF state.

17. The method as in claim 13 further comprising:
receiving the first voltage reference;
receiving the second voltage reference, a magnitude of voltage provided by the first voltage reference being greater than a magnitude of voltage provided by the second voltage reference;
in accordance with the received control signal, controlling a third switch to an ON state, the third switch electrically coupled to the second node of the capacitor, turning the third switch to the ON state increasing a magnitude of the output voltage to a level greater than the first voltage reference; and
wherein the level of the magnitude of the output voltage is greater than the first voltage reference by an amount of voltage across the first node and the second node of the capacitor.

18. A method comprising:
receiving a first reference voltage and a second reference voltage to power driver circuitry;
via the driver circuitry, producing an output voltage to drive an external switch to ON/OFF states in accordance with a received control signal, a range of the output voltage during the ON/OFF states substantially greater than a difference between the first reference voltage and the second reference voltage;
wherein the first reference voltage is less than the second reference voltage; and
wherein producing the output voltage to drive the external switch includes: i) in a first control state that turns the external switch OFF, producing the output voltage to be less than the first reference voltage, and ii) in a second control state that turns the external switch ON, producing the output voltage to be substantially equal to the magnitude of the second reference voltage.

19. The method as in claim 18, wherein producing the output voltage includes:
producing the output voltage to be a negative voltage to turn the external switch OFF, the negative voltage less than a magnitude of the first reference voltage, the negative voltage less than a magnitude of the second reference voltage.

20. The method as in claim 19, wherein producing the output voltage includes:
charging a respective capacitor in the driver circuitry, a voltage of the capacitor supporting generation of the output voltage to a magnitude that falls outside of a range defined by the first reference voltage and the second reference voltage.

21. The method as in claim 18, wherein producing the output voltage to drive the external switch to ON/OFF states in accordance with the received control signal further comprises:
producing the output voltage to be a first voltage level during a first control state, the first voltage level turning the external switch OFF;
producing the output voltage to be a second voltage level during a second control state, the second voltage level turning the external switch ON; and
producing the output voltage to be a third voltage level during a third control state, the second voltage level turning the external switch ON, the third voltage level greater than the second voltage level.

* * * * *